United States Patent [19]

Suzuki et al.

[11] Patent Number: 4,897,832
[45] Date of Patent: Jan. 30, 1990

[54] DIGITAL SPEECH INTERPOLATION SYSTEM AND SPEECH DETECTOR

[75] Inventors: Takao Suzuki; Yuichi Shiraki; Osamu Noguchi; Yasuo Shoji, all of Tokyo, Japan

[73] Assignee: Oki Electric Industry Co., Ltd., Tokyo, Japan

[21] Appl. No.: 297,668

[22] Filed: Jan. 17, 1989

[30] Foreign Application Priority Data

Jan. 18, 1988 [JP] Japan .................................. 63-6771
Jan. 18, 1988 [JP] Japan .................................. 63-6772

[51] Int. Cl.$^4$ .......................... H04J 3/17; H04L 5/14
[52] U.S. Cl. ................................... 370/81; 370/32.1; 379/410
[58] Field of Search ................... 370/32, 32.1, 79, 80, 370/81; 379/406, 410; 381/46, 47

[56] References Cited

U.S. PATENT DOCUMENTS

| | | | |
|---|---|---|---|
| 3,699,273 | 10/1972 | Montgomery | 370/32.1 |
| 3,991,287 | 11/1976 | May, Jr. et al. | 370/32.1 |
| 4,360,713 | 11/1982 | Joël | 370/32 |
| 4,408,324 | 10/1983 | Black et al. | 370/81 |
| 4,679,230 | 7/1987 | Lassaux et al. | 370/32.1 |

OTHER PUBLICATIONS

"Alternate Architectures and Technologies for IN-TELSAT Type DSI Design", J. M. Keelty et al., IEEE Journal of Selected Areas in Communications, vol. SAC-1, Jan. 1983.

Primary Examiner—Robert L. Griffin
Assistant Examiner—Wellington Chin
Attorney, Agent, or Firm—Spencer & Frank

[57] ABSTRACT

A digital speech interpolation (DSI) system serves multiple PCM channels by multiplexing them to a single PCM signal, detecting the presence of speech on individual channels according to an adaptive power threshold, removing silent portions of the channel signals, and recombining them into a signal with fewer channels. A central echo canceler is provided between the DSI transmitter and the multiplexer, thus eliminating the need for a separate echo protection device at each terminal. The central echo canceler provides information to the speech detector enabling the speech detector to avoid updating the adaptive power threshold when center clipping or double-talk occurs, thus preventing erratic speech detection performance. The speech detector also has a hangover controller that prevents speech dropouts by prolonging speech detect intervals by an amount that is adjusted according to the length of the interval, and according to the current adaptive power threshold; this form of control enables a constant activity ratio to be maintained under varying noise levels. Benefits include improved communication quality and reduced system cost.

16 Claims, 7 Drawing Sheets

ADAPTIVE POWER THRESHOLD VALUE (dBm0)

FIG. 8

DIGITAL SPEECH INTERPOLATION SYSTEM AND SPEECH DETECTOR

BACKGROUND OF THE INVENTION

This invention relates to a digital speech interpolation system having a centralized echo canceler and an improved speech detector.

Digital speech interpolation (hereinafter referred to as DSI) is used in, for example, satellite communication systems as a means of compressing voice signals to conserve channel resources. The transmitting apparatus in a DSI system includes a speech detector that detects the presence or absence of speech in the transmit signal, thus enabling the transmit signal to be compressed by the removal of silent portions. Typical voice signals have an activity ratio of less than 50%; that is, they consist of less than 50% speech and more than 50% silence. DSI accordingly makes it possible for the transmitting apparatus to have, for example, twice as many input channels as output channels. The input channels are assigned to output channels only when speech is detected. Assignment information is added to the DSI output signal so that the distant receiving apparatus can decompress the received signal and assign it to the appropriate receiving channels.

To ensure that channel activity ratios remain low enough for efficient compression, a DSI system must cope with the problem of echo, which occurs due to diversion of the receive signal into the transmit signal at the hybrid interface to the telephone or other terminal served by a channel. If not removed, echo will be mistakenly detected as speech by the speech detector. A simple method of removing echo is to attenuate the transmit signal when the receive level exceeds the transmit level; a device for this purpose is termed an echo suppressor. Such echo suppressors are unsatisfactory, however, in that they cut off one party's speech when both parties talk at once. A superior method of removing echo is to predict, from the level of the receive signal, the echo that will be diverted into in the transmit signal, generate a simulated echo signal, and subtract the simulated echo signal from the transmit signal, thereby substantially canceling the echo; a device for this purpose is termed an echo canceler. The characteristics of an echo canceler can be improved if the echo canceler can also, when necessary, perform center clipping, a process that eliminates low-level signal components in order to remove the remaining slight, uncanceled echo. Since echo must be removed from each channel individually, prior-art DSI systems have provided a separate echo canceler (or suppressor) for each terminal.

To maintain good speech quality, a DSI system must also cope with the problem of speech dropouts caused by overcompression, especially with the loss of low-level segments occurring at the ends of many words, and in the interior of some words. One way to prevent dropout is to provide the speech detector with a hangover controller that prolongs the detected speech interval by a certain amount. A prior-art scheme of hangover control employs a long and a short hangover time which are selected according to the length of the preceding speech interval. This hangover control system has been described in the article *Tekio-shikiichi-gata Onsei Kenshutsuki* ("An Adaptive-Threshold Speech Detector") by Kato, Nishiya, and Shimoyama, published by the Communication Systems Study Group of the Institute of Electronics and Communication Engineers of Japan in Report CS84-187.

Prior-art DSI systems as described above suffer from several problems. One problem is that providing a separate echo canceler at each terminal makes the system large, expensive, and inconvenient to operate and maintain. A second problem is that the separation of the echo cancelers from the speech detector prevents these devices from acting cooperatively. Center clipping, for example, strongly affects the behavior of the speech detector: if the speech detector does not make a special allowance for center clipping, it may alter its speech detection threshold in an inappropriate manner, causing background noise to be mistakenly detected as speech. The speech detector is also liable to operate incorrectly if the transmit signal leaks into the returning echo, a phenomenon referred to herein as double-talk. A further problem is that the hangover time added by the hangover controller is not responsive to the background noise level, in consequence of which either the hangover time is inadequate at high background noise levels, allowing the persistence of speech dropouts that degrade communication quality, or the hangover time is unnecessarily long at low background noise levels, causing the apparent activity ratio to rise with a deleterious effect on speech compression efficiency.

SUMMARY OF THE INVENTION

It is accordingly an object of the present invention to provide a DSI system with a centralized echo canceler and an improved speech detector, wherein the echo canceler furnishes the speech detector with information to enhance the accuracy of speech detection.

It is another object of this invention to provide an improved scheme of hangover control in the speech detector.

A DSI system according to the present invention comprises a receiving apparatus for receiving a compressed input signal and adding a noise signal to create a receive input signal, an N-channel echo canceler for receiving this receive input signal and a transmit input signal, detecting the presence of echo and double-talk, removing echo from the transmit input signal by a process that includes center clipping, and generating a transmit output signal, a center clipping detect signal, a double-talk detect signal, and a receive output signal. The DSI system in addition comprises a transmitting apparatus having a speech detector for receiving the transmit output signal, the center clipping detect signal, and the double-talk detect signal, detecting the presence of speech in the transmit output signal according to an adaptive power threshold that is updated to reflect changes in the background noise level in the transmit output signal, and generating a speech detect signal. The speech detector comprises means for enabling or disabling the updating of the adaptive power threshold according to the center clipping detect signal and the double-talk detect signal, and a hangover controller for prolonging the speech detect intervals by an amount that is varied according to the adaptive power threshold. By removing silent portions of the transmit output signal as indicated by the speech detect signal, the transmitting apparatus generates a compressed output signal comprising the speech portions of the transmit output signal.

DETAILED DESCRIPTION OF THE PREFERRED EMBODIMENTS

Figure 2:
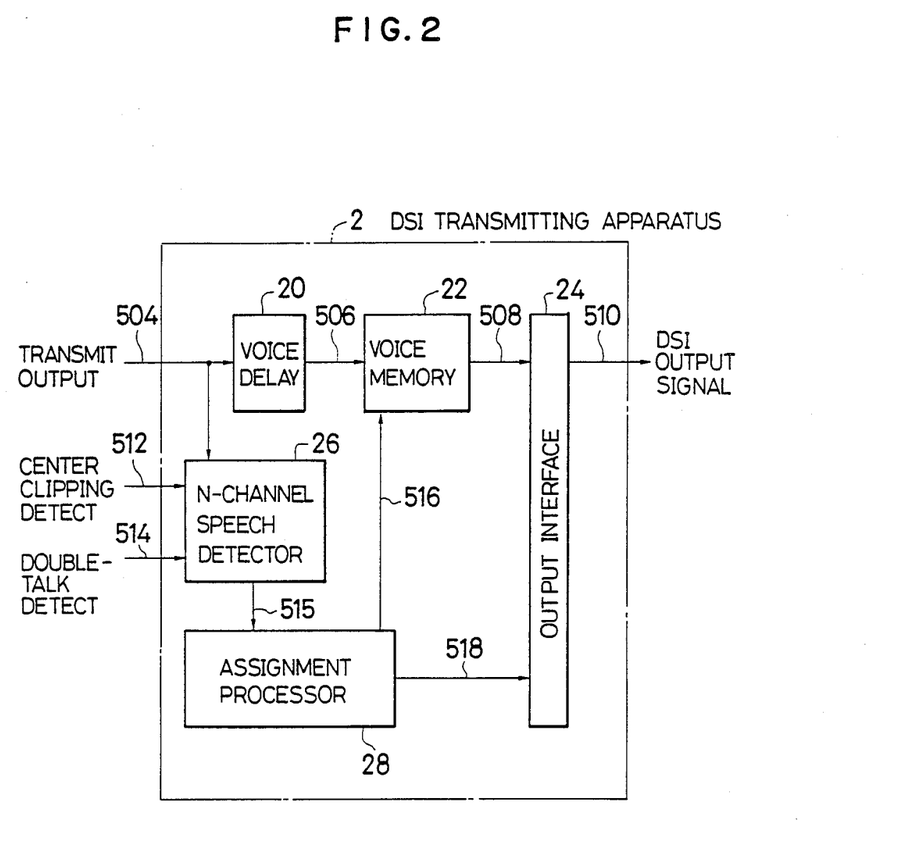
FIG. 2 is a more detailed block diagram of the DSI transmitting apparatus in FIG. 1.
Figure 3:
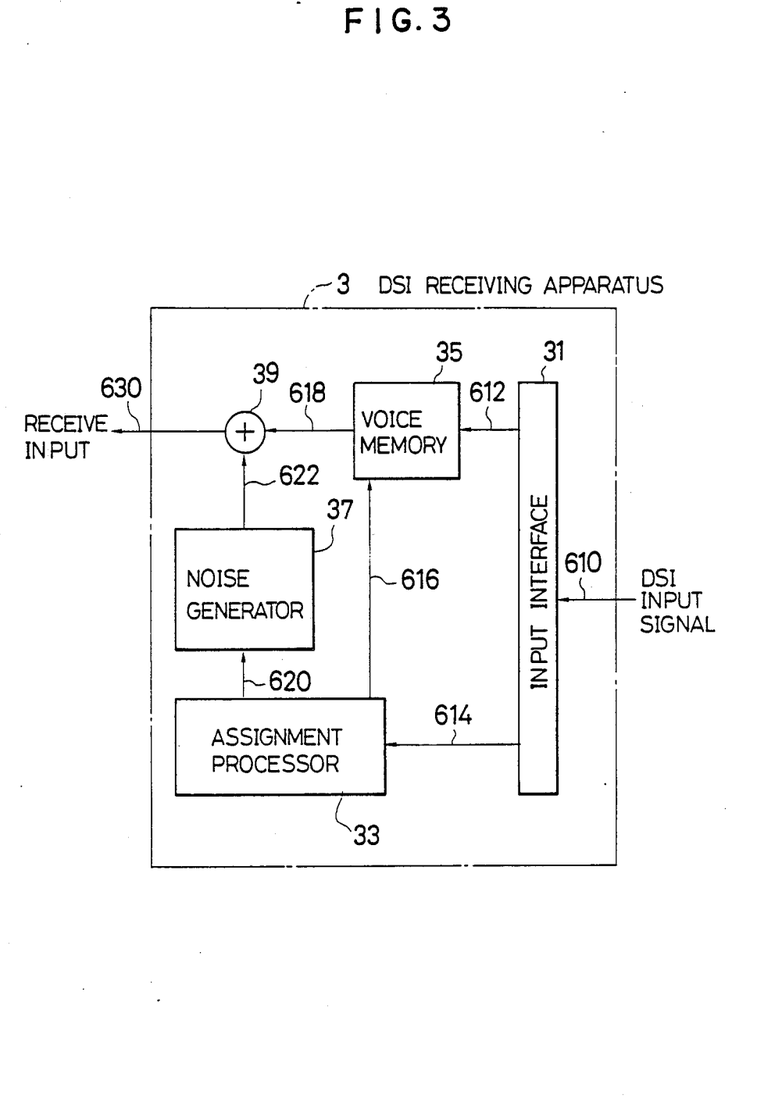
FIG. 3 is a more detailed block diagram of the DSI receiving apparatus in FIG. 1.

A novel DSI system embodying the present invention will be described with reference to the system block diagram in FIG. 1 and the more detailed block diagrams in FIGS. 2 to 4.

Figure 1:
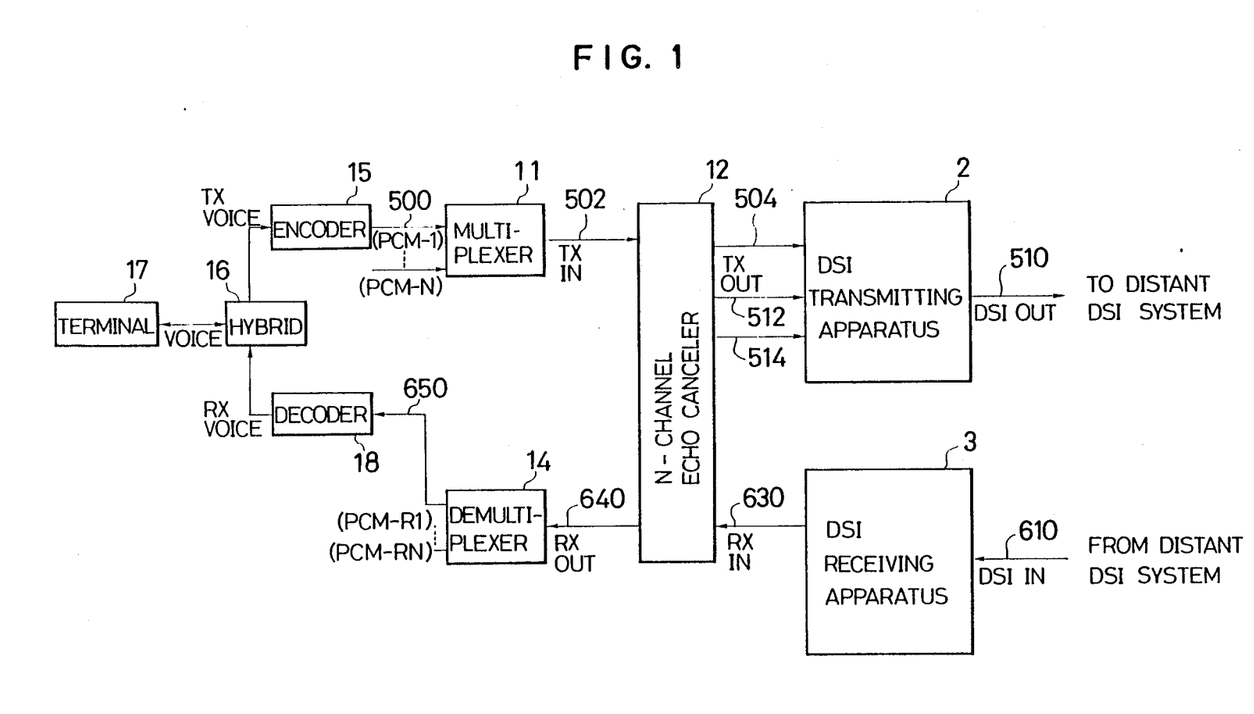
FIG. 1 is an overall block diagram of a DSI system according to the present invention.

As shown in FIG. 1, the novel DSI system comprises a DSI transmitting apparatus 2 and a DSI receiving apparatus 3, both of which are connected to a single N-channel echo canceler 12. The N-channel echo canceler 12 is in turn connected to a multiplexer 11 and a demultiplexer 14. The multiplexer 11 is connected via a plurality of PCM (Pulse-Coded Modulation) encoders 15 and hybrid interfaces 16 to a plurality of terminal devices 17 such as telephone sets, only one of which is shown in the drawing. The demultiplexer 14 is connected via a plurality of PCM decoders 18 to the hybrid interfaces 16, hence also to the terminal devices 17.

The hybrid interfaces 16 are well-known devices providing an interface between the four-wire communication scheme used by the DSI system and the two-wire scheme used by the terminal devices 17. Given perfect impedance matching, it is possible for a transmit signal and receive signal both to pass through a hybrid interface 16 with no leakage from one to the other. In practice, impedance matching is not perfect and part of the receive signal is diverted into the transmit signal. This diversion is referred to as echo because if not removed, it causes the distant party to hear an echo of his or her own voice.

The overall operation of the DSI system in FIG. 1 will be described next. In all of the subsequent descriptions, the same reference numeral will be used to refer to both an electrical signal and the signal line on which the signal is carried.

Analog voice (or other) signals generated at the terminal devices 17 are routed via the hybrid interfaces 16 to the PCM encoders 15, which encode them to digital PCM signals PCM-1 to PCM-N on lines 500. The PCM signals PCM-1 to PCM-N on lines 500 from different terminals 17 are interleaved in the time domain by the multiplexer 11 to create a single digital transmit input signal 502. The transmit input signal 502 is sent to the N-channel echo canceler 12, which performs an echo-canceling operation and generates a transmit output signal 504. The N-channel echo canceler 12 also generates a center clipping detect signal 512 and a double-talk detect signal 514. The transmit output signal 504, the center-clipping detect signal 512, and the double-talk detect signal 514 are all supplied to the DSI transmitting apparatus 2, which generates a compressed DSI output signal 510 that is sent, via a satellite link for example, to a distant DSI system.

The incoming DSI input signal 610 received from the distant DSI system is routed to the DSI receiving apparatus 3, which decompresses it to generate a receive input signal 630 that is supplied to the N-channel echo canceler 12. The N-channel echo canceler 12 samples the receive input signal 630 and passes it through as the receive output signal 640 to the demultiplexer 14, which demultiplexes it to create PCM signals PCM-R1 to PCM-RN on lines 650 for the individual channels. These are decoded by the PCM decoders 18 to create analog signals that are sent via the hybrid interfaces 16 to the terminal devices 17.

Next the internal structure of the DSI transmitting apparatus 2 will be described with reference to FIG. 2. The DSI transmitting apparatus 2 comprises a voice delay circuit 20, a voice memory 22, an output interface 24, an N-channel speech detector 26, and an assignment processor 28. The voice delay circuit 20 receives the transmit output signal 504 and supplies a delayed transmit signal 506 to the voice memory 22. The N-channel speech detector 26 receives the transmit output signal 504, the center clipping detect signal 512, and the double-talk detect signal 514 and supplies a speech detect signal 515 to the assignment processor 28. The assignment processor 28 receives the speech detect signal 515, sends a memory control signal 516 to the voice memory 22, and sends an assignment information signal 518 to the output interface 24. The voice memory 22 provides a channel data signal 508 to the output interface 24. The output interface 24 generates the DSI output signal 510.

The DSI transmitting apparatus 2 operates as follows. The voice delay circuit 20 delays the transmit output signal 504 by a fixed amount to compensate for the processing delay in the N-channel speech detector 26 and the assignment processor 28. During this delay period, the speech detector 26 detects the presence or absence of speech on each channel in the transmit output signal 504 and generates a speech detect signal 515, which it sends to the assignment processor 28. On the basis of the speech detect signal 515, the assignment processor 28 selects the input channels to be transmitted and assigns them to output channels. The voice delay circuit 20 now begins sending the channel data to the voice memory 22 via the delayed transmit signal line 506. The memory control signal 516 from the assignment processor 28 causes the voice memory 22 to store only the data for the assigned channels, then to supply these data in the required order to the output interface 24. The output interface 24 combines the channel data signal 508 from the voice memory 22 with the assignment information signal 518 from the assignment processor 28 and to generate the DSI output signal 510.

Next the internal structure of the DSI receiving apparatus 3 will be described with reference to FIG. 3. The DSI receiving apparatus 3 comprises an input interface 31, an assignment processor 33, a voice memory 35, a noise generator 37, and an adder 39. The input interface 31 receives the DSI input signal 610, sends a channel data signal 612 to the voice memory 35, and sends an assignment information signal 614 to the assignment processor 33. The voice memory 35 sends a speech signal 618 to the adder 39. The assignment processor 33 sends a memory control signal 16 to the voice memory 35 and a noise control signal 620 to the noise generator 37. The noise generator 37 sends a noise signal 622 to the adder 39. The adder 39 generates the receive input signal 630.

The DSI receiving apparatus 3 operates as follows. The input interface 31 extracts the assignment information from the DSI input signal 610 and sends it via the assignment information signal line 614 to the assignment processor 33, while sending the remaining channel data via the channel data signal line 612 to be stored temporarily in the voice memory 35. From the assignment information signal 614, the assignment processor 33 determines how to assign the input channels to the output channels, and sends a memory control signal 616 to the voice memory 35 causing the voice memory 35 to read out the channel data at the necessary times in the necessary order, thus creating the speech signal 618. For output channels to which no input channel is assigned the assignment processor 33 instructs the noise generator 37 to generate a noise signal 622. The adder 39 combines the speech signal 618 from the adder 39 with the noise signal 622 to create the receive input signal 630.

Next the internal structure and operation of the N-channel echo canceler 12 and the N-channel speech detector 26 (FIG. 2) will be described with reference to FIG. 4. For simplicity, only the part pertaining to one of the N channels (the n-th channel or channel n) is shown; it will be understood that similar facilities are provided for the other channels as well. The respective parts for the different channels operate in a time-sharing manner and in sequence to process the multiplexed data for the respective channels.

The N-channel echo canceler 12 comprises, for each channel, an adder 120, a center clipper 122, an M-th order digital filter 124, and a filter coefficient controller 126. The value of M, i.e., the order of the filter 124 can be up to several tens. Greater value of M gives higher accuracy. The adder 120 receives the transmit input signal 502, combines it with a simulated echo signal 530 from the M-th order digital filter 124, and furnishes the resulting echo-canceled signal 532 to the center clipper 122 and the filter coefficient controller 126. The filter coefficient controller 126 receives the transmit input signal 502, the echo-canceled signal 532, and the receive input signal 630 and generates the center-clipping detect signal 512 and double-talk detect signal 514 which it provides to the N-channel speech detector 26, a center clipping request signal 534 which it provides to the center clipper 122, and a filter coefficient signal 536 which it provides to the M-th order digital filter 124. The M-th order digital filter 124 receives the filter coefficient signal 536 and the receive input signal 630 and generates the simulated echo signal 530.

As explained with reference to FIG. 1, the receive output signal 640 and the transmit input signal 502 are connected to the same hybrid interface, at which interface part of the receive signal may be diverted into the transmit signal as an echo; that is there is an echo path from the receive output signal 640 to the transmit input signal 502. Accordingly, the transmit input signal 502 comprises two components: the desired component Zn transmitted from the terminal device, and an echo component En diverted from the receive output signal 640 via the echo path. The function of the N-channel echo canceler 12 is to estimate the impulse response of the echo path and thereby create a simulated echo signal $-Eni$ that is substantially equal in magnitude but opposite in sign to the actual echo En. The adder 120 adds the transmit input signal $En+Zn$ and the simulated echo signal $-Eni$; their sum $En+Zn-Eni$ is the echo-canceled signal 532 furnished to the center clipper 122 and the filter coefficient controller 126.

One of the functions of the filter coefficient controller 126 is to estimate the filter coefficients that will produce the optimum simulated echo value and send them to the M-th order digital filter 124. Applying these to the receive input signal 630, the M-th order digital filter 124 generates the negative simulated echo $-Eni$. The operation of the M-th order digital filter 124 and the algorithm by which the optimum filter coefficients are estimated are well known and will not be described here.

The echo-canceled signal 532 may contain a slight residual echo which must be removed by clipping the central portion of the signal; that is, by reducing low-level portions of the signal to zero level. From its three inputs, the filter coefficient controller 126 detects the need for such center clipping, sends a center clipping request signal 534 to the center clipper 122, and sends a center clipping detect signal 512 to the N-channel speech detector 26. In response to the center clipping request signal 534, the center clipper 122 reshapes the echo-canceled signal 532 from the adder 120 as shown in FIG. 5. The clipping voltage Vc in FIG. 5 is adjusted by the filter coefficient controller 126 according to the receive input level.

Figure 6:
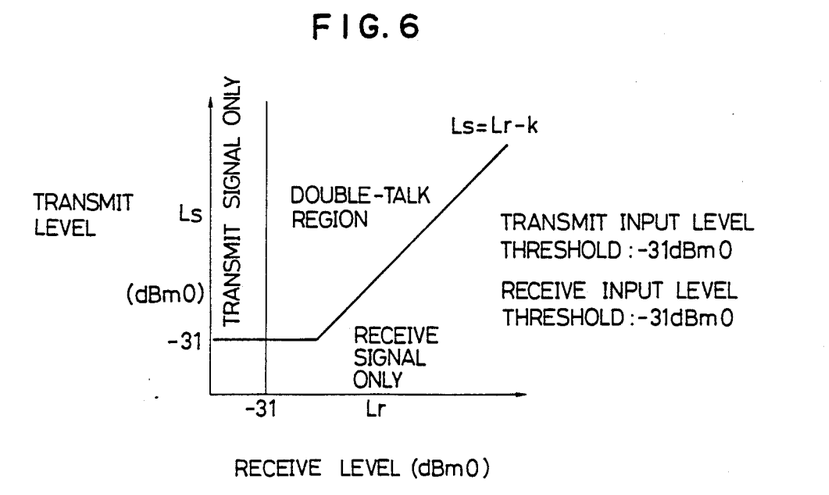
FIG. 6 is a graph illustrating double-talk detection by the filter coefficient controller in FIG. 4.

The filter coefficient controller 126 further detects double-talk and generates a double-talk detect signal 514, which it sends to the N-channel speech detector 26. Doubletalk occurs when the transmit signal reappears in the echo. The method by which double-talk is detected in the novel DSI system is illustrated in FIG. 6, in which the level Ls of the transmit input signal 502 is shown on the vertical axis and the level Lr of the receive input signal 630 is shown on the horizontal axis. The filter coefficient controller 126 detects presence of the transmit signal 502 at a threshold level of $-31dBmO$, and detects presence of the receive input signal 630 at the same threshold level of $-31dBmO$. Doubletalk is detected when the transmit level Ls is greater than the threshold level and lies above the line defined by the equation $Ls=Lr-k$, where k is a constant. The value of k represents a loss which can be regarded as being effectively inserted in the reception communication path.

Next the internal structure and operation of the speech detector 26 will be described.

Figure 4:
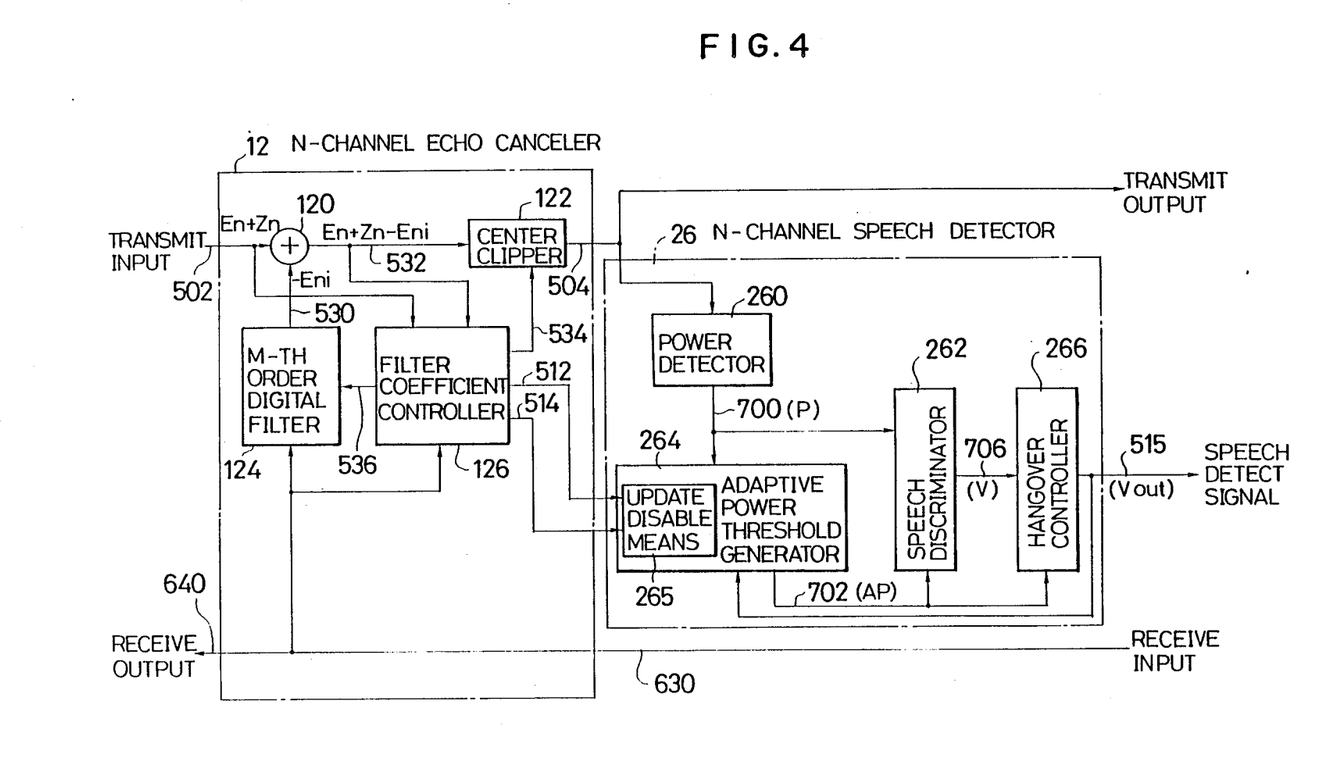
FIG. 4 is a more detailed block diagram of the echo canceler and speech detector in FIGS. 1 and 2.
Figure 5:
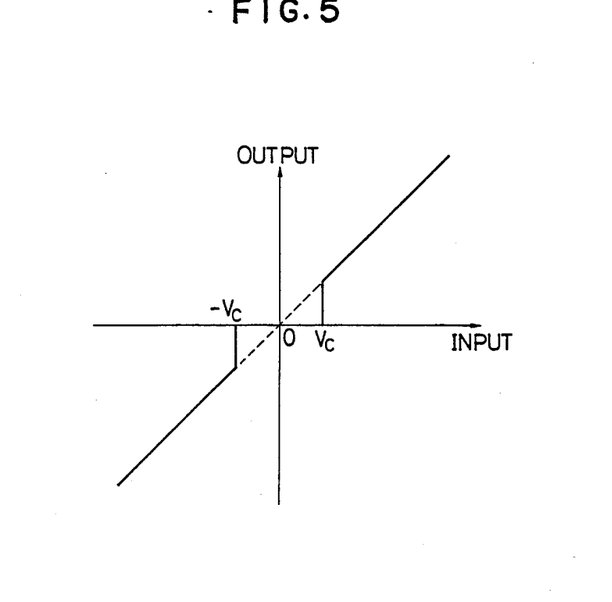
FIG. 5 is a graph illustrating the input-output characteristic of the center clipper in FIG. 4.

As shown in FIG. 4, the N-channel speech detector 26 comprises, for each channel, a power detector 260, a speech discriminator 262, an adaptive power threshold generator 264, and a hangover controller 266. The adaptive power threshold generator 264 includes an update disabling means 265. The power detector 260 receives the transmit output signal 504 from the echo canceler 12 and provides an average power signal 700 to the speech discriminator 262 and the adaptive power threshold generator 264. The adaptive power threshold generator 264 receives the average power signal 700 from the power detector 260, receives the center clipping detect signal 512 and the double-talk detect signal 514 from the echo canceler 12, and sends an adaptive power threshold signal 702 to the speech discriminator 262 and the hangover controller 266. The speech discriminator 262 receives the average power signal 700 from the power detector 260 and the adaptive power threshold signal 702 from the adaptive power threshold generator 264 and sends a speech-silence signal 706 to the hangover controller 266. The hangover controller 266 creates the speech detect signal 515. The speech detect signal 515 has the value "1," indicating that speech is present in the transmit output signal 504, or the value "0," indicating that speech is not present in the transmit output signal 504.

First a general description of the operation of the N-channel speech detector 26 will be given. The power detector 260 samples the transmit output signal 504 for a certain length of time, 10 ms for example, called a "block" and determines the average signal power level for each block. The adaptive power threshold generator 264 detects the background noise level by monitoring the average power level during silent portions of the transmit output signal 504 and calculates therefrom an adaptive power threshold. The adaptive power threshold provides the criterion by which the speech discriminator 262 discriminates between speech and silence, and by which the hangover controller 266 determines the amount by which to prolong the detected speech intervals.

Detailed descriptions will next be given of the operation of the speech discriminator 262, the hangover controller 266, and the adaptive power threshold generator 264. For brevity, the value of the average power signal 700 will be denoted by the letter P, the value of the adaptive power threshold signal 702 by the letters AP, the value of the speech-silence signal 706 by the letter V, and the value of the speech detect signal 515 by the letters Vout.

The adaptive power threshold generator 264 monitors the state of Vout and counts consecutive blocks that are indicated as silent (Vout=0). When the count reaches a certain run value, corresponding to a time of 100 ms for example, the adaptive power threshold generator 264 determines the average power level Pn of this run of silent blocks, then calculates the adaptive power threshold AP according to the following formula, in which K is a constant:

$$AP = K \cdot Pn$$

Thus the adaptive power threshold AP rises in proportion to the background noise level. The constant K should have a value greater than unity, and should preferably be high enough to ensure that, for a given background noise level, background noises are not mistakenly detected as speech. Each time the adaptive power threshold generator 264 calculates a new value of AP, it updates the value of the adaptive threshold signal 702 supplied to the speech discriminator 262 and the hangover controller 266.

A novel feature of this invention is that the adaptive power threshold generator 264 is provided with an update disabling means 265 for disabling the updating of the value of AP at times when center clipping or double-talk is detected, as indicated by the center clipping detect signal 512 or the double-talk detect signal 514. The update disabling means can be a circuit element such as a switch or a gate. If the adaptive power threshold generator 264 is implemented using a device such as a microcomputer, the update disabling means can be implemented by use of a set of instructions in a computer program. When updating of the value of AP is disabled, the adaptive power threshold generator 264 continues to supply the old value of AP to the speech discriminator 262 and the hangover controller 266 as the adaptive threshold signal 702.

The reason for disabling the update of AP when center clipping or double-talk is detected is that center clipping causes an abrupt drop in the background noise level, while double-talk causes extreme fluctuations in the background noise level. If the adaptive power threshold is allowed to track these abrupt drops and extreme fluctuations, as in prior-art systems in which the speech detector 26 does not receive a center clipping detect signal or double-talk detect signal from the echo canceler, speech detection tends to become erratic whenever center clipping or double-talk occurs. The problem is particularly severe at high background noise levels.

The speech discriminator 262 compares the average power signal P received from the power detector 260 with the adaptive power threshold AP received from the adaptive power threshold generator 264 and sets the speech-silence signal V to "1" or "0" according to the result as follows:

$V = 1$ (speech) if $P > AP$ $V = 0$ (silence) if $P \leq AP$.

The hangover controller 266 generates, at 515, Vout from V as follows. Normally Vout is equal to V. When V changes from "1" to "0," however, the hangover controller 266 maintains Vout in the "1" state for a period of time called the hangover time. Thus:

Vout = 1 during hangover time

Vout = V at other times.

To determine the duration of the hangover time, the hangover controller 266 first decides whether the hangover time is to be long (HL) or short (HS). This decision is made by monitoring the state of V in a preceding interval. Specifically, the hangover controller 266 selects the long hangover HL if $V = 1$ for a certain number of continuous preceding blocks; otherwise it selects the short hangover HS. That is, the long hangover time is applied during continuous speech, while the short hangover time is applied to stray noise and other intermittent sounds.

Figure 7:
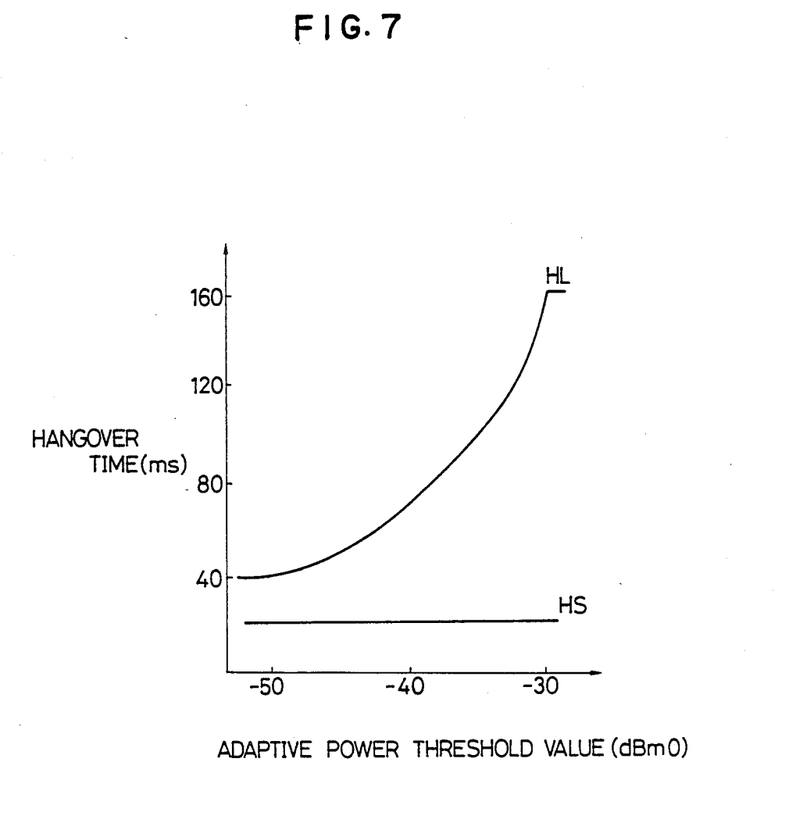
FIG. 7 is a graph illustrating the hangover control scheme used by the hangover controller in FIG. 4.

When it selects long or short hangover, the hangover controller 266 also the length of the long or short hangover time according to the current adaptive power threshold AP as shown in FIG. 7. The long hangover time HL increases as AP increases. The short hangover time HS is constant for all values of AP, in order to maintain a constant error rate with respect to the background power level. The specific values of HL and HS can be any values satisfying the preceding conditions.

The reason for lengthening the long hangover time HL as the adaptive threshold AP rises is to prevent high levels of background noise from causing speech dropouts. That is, as the background noise level rises and the adaptive threshold AP is raised correspondingly, increasingly long portions of the speaker's words tend to fall below the adaptive power threshold value. Lengthening the long hangover time HL compensates for this effect. If the relationship between HL and AP is suitably selected, it is possible to provide adequate hangover to prevent the loss of speech without raising the speech activity ratio, because as the adaptive power threshold rises, the proportion of silent time detected by the speech discriminator 262 also rises.

Figure 8:
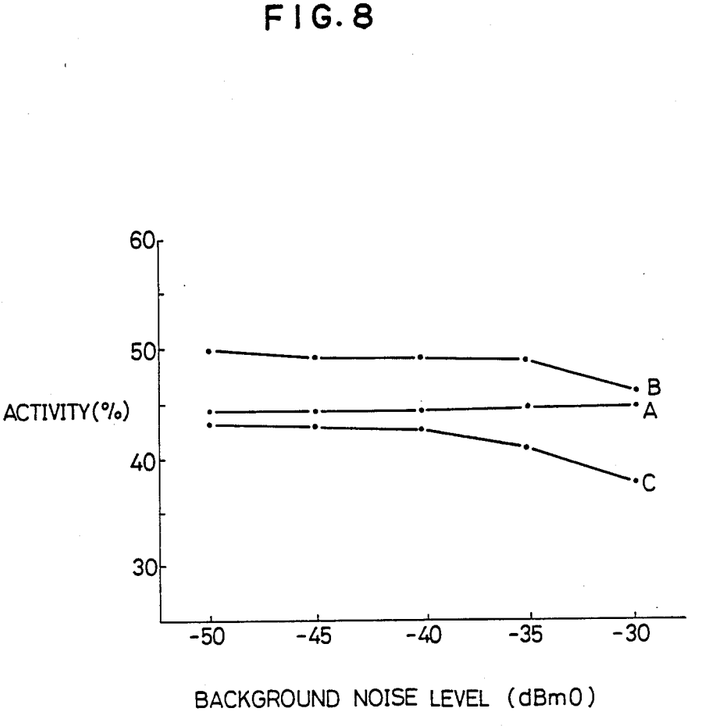
FIG. 8 is a graph comparing the activity ratio resulting from the hangover control scheme in FIG. 7 with that resulting from a prior-art hangover control scheme.

FIG. 8 shows test results illustrating the relation between the background noise power level and the activity ratio with the novel scheme of hangover control shown in FIG. 7, and with other hangover control schemes having a constant long hangover time (HL). The characteristic curve marked A was obtained using the novel hangover control scheme with a long hangover time (HL) varying from 40 ms to 160 ms and a constant short hangover time (HS) of 20 ms, as in FIG. 7. The curves B and C were obtained when the novel hangover control scheme wa not used. For the curve B the long hangover time HL was fixed at 160 ms and the short hangover time HS at 20 ms. For the curve C the long hangover time HL was fixed at 40 ms and the short hangover time HS at 20 ms.

Due to the large fixed long hangover of 160 ms in curve B, at low background power levels the hangover control scheme prolonged the speech intervals by an unnecessary amount, causing the apparent activity ratio to rise to a value in the neighborhood of 50%. When the long hangover time was changed to 40 ms as in curve C, increasing the loss of low-power speech portions occurred at high background noise levels, causing a decline at the activity ratio, indicative of a decline in communication quality. The characteristic curve A of the novel scheme, however, showed substantially constant activity level at all background power levels. The novel speech detector accordingly enables stable high speech quality to be maintained without loss of word endings or blanking of interior portions of words.

An advantage of the novel DSI system is that since the echo canceler is integrated with the DSI transmitting and receiving apparatus, it is not necessary to provide an echo protection device for each terminal, as in the prior art. The novel DSI system is therefore more compact in size and lower in cost, and is easier to operate and maintain.

A further advantage is the improved accuracy of the adaptive power threshold used in the speech detector, which is attained by preventing the adaptive power threshold from being updated in response to artifacts in the transmit signal caused by center clipping or double-talk. As a result, speech and silence are detected accurately and the system does not tend to operate incorrectly in the presence of noise.

Yet a further advantage is the improved scheme of hangover control, in which the long hangover time is varied in response to the adaptive power threshold. As a result of this scheme the speech detector operates correctly at all noise levels, preventing speech dropouts without raising the activity ratio.

The scope of this invention is not limited to the DSI system described above, but includes many variations and modifications that will be obvious to one skilled in the art. In particular, equipment blocks shown as separate in the drawings, such as the echo canceler and speech detector, can be integrated into a single unit, or can be implemented by program executing on a computing device such as a single-chip microcomputer or single-board computer.

What is claimed is:

1. A digital speech interpolation system, comprising:
   a receiving apparatus for receiving a compressed input signal and adding to it a noise signal, thereby generating a receive input signal;
   an N-channel echo canceler for receiving a multiplexed transmit input signal and said receive input signal, detecting double-talk to produce a double-talk detect signal, detecting echo of said receive input signal in said transmit input signal, and removing said echo from said transmit input signal by a process that includes center clipping to produce a multiplexed transmit output signal, said echo canceler also generating a center clipping detect signal when the center clipping is performed; and
   a transmitting apparatus for receiving said transmit output signal, said center clipping detect signal, and said double-talk detect signal from said echo canceler, detecting the presence of speech in said transmit output signal by using an adaptive power threshold that is updated according to a background noise level in said transmit output signal, the updating being enabled or disabled according to said center clipping detect signal and said double-talk detect signal, and generating a compressed output signal consisting essentially of the speech portions of said transmit output signal.

2. A digital speech interpolation system according to claim 1, wherein said center clipping detect signal is a binary-valued signal having a true state and a false state, said center clipping detect signal assumes the true state when said echo canceler performs center clipping and the false state when said echo canceler does not perform center clipping.

3. A digital speech interpolation system according to claim 2, wherein said transmitting apparatus comprises a speech detector for receiving said transmit output signal, said center clipping detect signal, and said double-talk detect signal and generating a speech detect signal having a true state indicating that speech is detected and a false state indicating that speech is not detected, said speech detector comprising:
   a power detector for receiving said transmit output signal, dividing it into blocks, calculating the average power in respective blocks, and generating an average power signal;
   an adaptive power threshold generator for receiving said average power signal, said center clipping detect signal, said double-talk detect signal, and said speech detect signal, determining said background noise level from said average power signal and said speech detect signal, updating said adaptive power threshold according to said background noise level when said center clipping detect signal and double-talk detect signal are both false, but maintaining said adaptive power threshold in its previous state if either said center clipping detect signal or double-talk detect signal is true; and
   a speech discriminator for receiving said average power signal and said adaptive power threshold signal, comparing said average power signal with said adaptive power threshold signal, and generating a speech-silence signal that assumes a true state when said average power signal is higher than said adaptive power threshold.

4. A digital speech interpolation system according to claim 3, wherein said adaptive power threshold generator determines said background noise level by calculating the average value of said average power signal over a certain interval, this calculation being performed only if said speech detect signal is false throughout this interval.

5. A digital speech interpolation system according to claim 4, wherein said adaptive power threshold generator updates said adaptive power threshold to a value equal to said background noise level multiplied by a constant greater than unity.

6. A digital speech interpolation system according to claim 3, wherein said speech detector further comprises a hangover controller for receiving said speech-silence signal and said adaptive power threshold signal, and generating said speech detect signal by adding a hangover time to the intervals for which said speech-silence signal is in the true state, said hangover time being determined according to said adaptive power threshold.

7. A digital speech interpolation system according to claim 6, wherein said hangover controller selects for said hangover time either a fixed hangover time, or a variable hangover time that varies in an increasing manner with said adaptive power threshold.

8. A digital speech interpolation system according to claim 7, wherein said hangover controller selects said variable hangover time if said speech-silence signal is in the true state for a certain continuous preceding interval, and selects said fixed hangover time otherwise.

9. A digital speech interpolation system according to claim 8, wherein said fixed hangover time is shorter than any value assumed by said variable hangover time.

10. A speech detector for receiving an input signal, a center clipping detect signal, and a double-talk detect signal and generating a speech detect signal having a true state indicating that speech is detected and a false state indicating that speech is not detected, said speech detector comprising:

a power detector for receiving said input signal, dividing it into blocks, calculating an average power in respective blocks, and generating an average power signal;

an adaptive power threshold generator for receiving said average power signal, said center clipping detect signal, said double-talk detect signal, and said speech detect signal, determining a background noise level in said input signal from said average power signal and said speech detect signal, updating an adaptive power threshold according to said background noise level when said center clipping detect signal and double-talk detect signal are both false, but maintaining said adaptive power threshold in its previous state if either said center clipping detect signal or double-talk detect signal is true; and a speech discriminator for receiving said average power signal and said adaptive power threshold signal, comparing said average power signal with said adaptive power threshold signal, and generating a speech-silence signal that assumes a true state when said average power signal is higher than said adaptive power threshold.

11. A speech detector according to claim 10, wherein said adaptive power threshold generator determines said background noise level by calculating the average value of said average power signal over a certain interval, this calculation being performed only if said speech detect signal is false throughout this interval.

12. A speech detector according to claim 11, wherein said adaptive power threshold generator updates said adaptive power threshold to a value equal to said background noise level multiplied by a constant greater than unity.

13. A speech detector according to claim 10, wherein said speech detector further comprises a hangover controller for receiving said speech-silence signal and said adaptive power threshold signal, and generating said speech detect signal by adding a hangover time to the intervals for which said speech-silence signal is in the true state, said hangover time being determined according to said adaptive power threshold.

14. A speech detector according to claim 13, wherein said hangover controller selects for said hangover time either a fixed hangover time, or a variable hangover time that varies in an increasing manner with said adaptive power threshold.

15. A speech detector according to claim 14, wherein said hangover controller selects said variable hangover time if said speech-silence signal is in the true state for a certain continuous preceding interval, and selects said fixed hangover time otherwise.

16. A speech detector according to claim 15, wherein said fixed hangover time is shorter than any value assumed by said variable hangover time.

* * * * *